3,444,198
PROCESS FOR PRODUCING
α-6-DEOXYTETRACYCLINES
James J. Korst, Old Lyme, Conn., assignor to Chas.
Pfizer & Co., Inc., New York, N.Y., a corporation of Delaware
No Drawing. Continuation-in-part of application Ser. No. 615,317, Feb. 13, 1967. This application Jan. 19, 1968, Ser. No. 699,016
Int. Cl. C07c 103/19
U.S. Cl. 260—559
15 Claims

ABSTRACT OF THE DISCLOSURE

In producing α- and β-6-deoxytetracyclines by catalytic hydrogenation of 6-deoxy-6-demethyl-6-methylenetetracyclines and their 11a-chloro derivatives or the salts of these compounds, an increased ratio of α to β-isomer in the reaction product is obtained when the noble metal hydrogenation catalyst is poisoned.

CROSS REFERENCE TO RELATED APPLICATION

The instant application is a continuation-in-part of copending application Serial No. 615,317, filed Feb. 13, 1967 and now abandoned.

BACKGROUND OF THE INVENTION

The present invention relates to a new and improved process for producing α-6-deoxytetracyclines. More particularly, the process of the present invention is based on the discovery of catalyst systems which unexpectedly result in the production of a high ratio of α-6-deoxytetracycline to β-6-deoxytetracycline product upon catalytically hydrogenating a 6-deoxy-6-demethyl-6-methylene tetracycline.

U.S. Patent No. 3,200,149 discloses and claims, inter alia, a novel group of tetracycline compounds which are generally designated as α-6-deoxytetracyclines. The designation, "6-epi" and "α" are used interchangeably therein to refer to identical spatial orientation of the 6-methyl substituent U.S. Patent No. 3,165,531 uses the designation "6-epi" in the same sense as used in U.S. Patent No. 3,200,-149 and appropriately uses "6-deoxytetracyclines" when referring to the known prior art isomers. The latter compounds have now been more precisely designated in the scientific literature as β-6-deoxytetracyclines and the present disclosure uses the "α" and "β" terminology in the same context.

The process of U.S. Patent No. 3,200,149 for producing α-6-deoxytetracyclines involves noble-metal catalytic hydrogenation of a 6-deoxy-6-demethyl-6-methylene tetracycline to produce a mixture containing the corresponding α-6-deoxytetracycline and the corresponding β-6-deoxytetracycline. This reaction mixture is then separated to obtain the desired α-isomer. Under preferred operating conditions, that process is generally capable of producing up to about a 1:1 mixture of α- to β-isomer. In view of the fact that the α-isomers, particularly α-6-deoxy-5-oxytetracycline, are of a higher order of activity than the corresponding β-isomers, a significant improvement in the α- to β-isomer ratio without substantial reduction in the yield of the mixture of isomers is of substantial importance.

SUMMARY OF THE INVENTION

The present invention is based on the discovery that it is possible to obtain a significant improvement in the α- to β-isomer ratio as well as an enhanced yield of the mixture of isomers if the noble metal catalyst employed is, prior to hydrogenation, poisoned with an appropriate amount of a poison selected from quinoline-sulfur, carbon monoxide, thiourea, tetramethylthiourea, 7,8-benzoquinoline-sulfur, 1,3-di-n-butyl-2-thiourea, N,N-di-tert. butyl-2-thiourea, potassium ethyl xanthate, 1-phenyl-3-di-(2-hydroxyethyl)-2-thiourea, 1-phenyl-3 - (2 - hydroxyethyl)-2-thourea, 1-phenyl-2-thiourea, 1-ethyl - 1 - (1-naphthyl)-2-thiourea, 1-p-hydroxyphenyl-2-thiourea, beta-isothioureidopropionic acid, 2-imidazolidinethione, isoquinoline-sulfur, quinaldine-sulfur, 4-methylquinoline-sulfur, 1,3-diethyl-2-thiourea, N,N-diethyl-2-thiourea, carbon disulfide 2-mercaptopyridine and L-cystine. Quinoline-sulfur, also referred to as quinoline-S, will be recognized by those skilled in the art as a catalyst poison often used in Rosenmund reductions involving the catalytic hydrogenation of an acid chloride to produce the corresponding aldehyde. In the Rosenmund reduction, the purpose of quinoline-sulfur is to inactivate the catalyst to the extent necessary to obtain the following reaction:

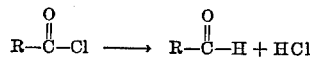

without concomitant production of R—CH$_2$—OH. Thus, the poisoning agent does not seriously inhibit the desired reduction of the highly reactive acid chloride but effectively prevents hydrogenation of the desired aldehyde product to the corresponding alcohol.

Although those skilled in the art might predict that quinoline-sulfur would have the capacity of controlling the extent of hydrogenation of a compound such as 11a-chloro-6-deoxy-6-demethyl-6 - methylene - 5 - oxytetracycline, the 11a-chloro substituent being more susceptible to hydrogenation than the 6-methylene substituent, an entirely unobvious result is obtained in accordance with process of the present invention, viz. the reaction continues through reduction of the double bond whereupon the α- to β-isomer ratio is found to be substantially higher than the normal ratio obtained with unpoisoned catalyst. In addition, side reactions and degradation are suppressed, with an increase in overall yield of the isomer mixture. Similarly, it has been found that not all noble metal catalyst poisons give the desired result. Metallic salt solutions, trialkylphosphite and ethylene, for example, are not useful in this invention. Of the useful poisons, quinoline-sulfur, carbon monoxide, 1-phenyl-3-(2-hydroxyethyl)-2-thiourea, 7,8-benzoquinoline-sulfur and thiourea are preferred.

DETAILED DESCRIPTION OF THE INVENTION

Quinoline-sulfur is, as previously indicated, a well known poisoning agent. A typical method of preparing the same is included hereinafter in Example I. Additionally, Example I illustrates the preparation of a fractionated variation thereof. Quinaldine-sulfur, 7,8-benzoquinoline-sulfur, 4-methylquinoline-sulfur and isoquinoline-sulfur are prepared in analogous manner to quinoline-sulfur. The remaining poisons are also known organic compounds, commercially available or readily prepared by known methods.

The poisoned noble metal catalyst of the present invention should, for optimum results, be carefully calibrated to the operating conditions of the hydrogenation process. Whereas the amount of noble metal catalyst employed may correspond to that used in the prior art process of U.S. Patent No. 3,200,149 and as such is not particularly critical, the optimum ratio of poison to catalyst should be determined to achieve the high ratio of α- to β-isomer with a concomitant increase in the yield of the isomer mixture. The procedure for determining appropriate ratios of poison to catalyst so as to promote an enhanced ratio of α- to β-isomer is described hereinafter following a description of the other process conditions and is fully illustrated by the examples.

In accordance with the process of the present invention, the tetracycline compounds employed as starting materials are selected from the group consisting of

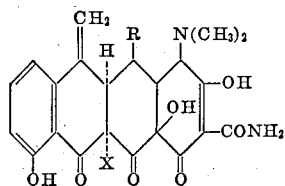

acid addition salts thereof and polyvalent metal salt complexes thereof wherein R is selected from the group consisting of hydrogen and hydroxyl and X is selected from the group consisting of hydrogen and chloro.

The selected tetracycline starting material is dissolved or suspended in a reaction-inert solvent medium in the presence of a catalytic amount of the poisoned noble metal catalyst and contacted with hydrogen at an appropriate temperature and pressure until reduction of the 6-methylene group occurs. Thereafter, the mixed α-β-isomers may be recovered by conventional procedure involving catalyst removal and recovery from the solvent medium. This mixture may then be subjected to chromatographic or other procedures to separate the mixture into its isomeric components. A typical method of separation is included in the examples hereinafter.

The expression "reaction-inert solvent medium" refers to any medium which is a solvent or suitable suspending agent for the tetracycline reactant, is stable under the hydrogenation conditions, and does not interfere with the effectiveness of the catalyst or interact with the antibiotic. Polar organic solvents are generally suitable and include those enumerated in U.S. Patent No. 3,200,149. As is the case in the process of that patent, basic media are undesirable since they tend to promote decomposition, reducing the yield of the desired product.

Excellent results are achieved in a wide range of reaction media including methanol; acetone; methyl ethyl ketone; dioxane; formamide; alkyl and dialkyl formamide of one to four carbon atoms in each alkyl group; N-methyl acetamide; N,N-dimethylacetamide; N-methyl, N-acetylformamide; N,N-diethylacetoacetamide; pyrrolidone; N-methyl-2-pyrrolidone; methyl 1-methyl-2-pyrrolidone-4-carboxylate; ethylene glycol; propylene glycol; 2-methoxyethanol; 2-ethoxyethanol; acetonitrile; tetramethylurea; tetrahydrofuran and gamma butyrolactone. It will be apparent that mixtures of these solvents may also be employed. Preferred solvents for the reaction include N-methyl formamide; N-methyl acetamide; methyl 1-methyl-2-pyrrolidone-4-carboxylate; and tetramethyl urea; and particularly preferred are acetone, N,N-dimethyl-acetamide, N,N-dimethylformamide and N-methyl-2-pyrrolidone. Additionally, such solvents often gove best results when they contain from about 20 to 80 volume percent water.

Particular virtues of the foregoing solvents include the following:

(1) Noble metal catalysts even prior to poisoning remain relatively stable in these media, whereas it is advisable to introduce the poison promptly where a solvent such as methanol is employed, to avoid the possibility of catalyst degradation.

(2) It is well known in the catalyst art that different lots of the same catalyst exhibit variable performance in their intended function. The enumerated media, however, have been found to give consistently high product yields even with so-called inferior catalyst batches.

(3) Enhanced solubility provided by many of these media often permit the use of particularly high substrate concentrations, up to 30% by weight and more.

(4) These media provide optimum results at relatively low weight ratios of catalyst to substrate, often at ratios of about 1:2 and lower.

(5) Particularly high yields of α-isomer are afforded with these media.

As in other hydrogenations of tetracycline antibiotics, temperature is not a particularly critical condition so long as it is high enough to promote adequate reaction rates and does not become so high as to promote undesired byproduct formation. In general, temperatures of from about 0 to about 60° C. are preferred. Within this range a temperature of from about 20 to 40° C. is particularly preferred.

Noble metal catalysts employed in the present invention include platinum, palladium, rhodium and ruthenium, either of the supported or non-supported type, as well as the known catalytic compounds thereof such as oxides, chlorides, etc. Examples of suitable catalyst supports include carbon, silica, alumina and barium sulfate. Examples of preferred catalysts are 5% palladium-on-carbon, 5% palladium-on-barium sulfate, 5% palladium-on-alumina, 5% palladium-on-barium carbonate, 5% rhodium-on-carbon and 5% rhodium-on-alumina catalysts. The expression "catalytic amount" as used herein is well understood by those skilled in the art of known tetracycline hydrogenations and typical amounts are illustrated by the examples appearing hereinafter. Best results are usually achieved with from about 0.1 to 2 parts by weight of catalyst, dry basis, per part of substrate, although higher or lower ratios are also employed successfully. Typically, an equal weight of catalyst and tetracycline compound may be used.

The pressure employed during hydrogenation may range from subatmospheric to 2,000 p.s.i. or even higher if suitable equipment is available. Sub-atmospheric pressures down to 100 mm. Hg or even lower can be employed successfully, but for speed and convenience, hydrogen pressures of one atmosphere or higher are usually preferred. In general, pressures ranging up to about 70 p.s.i. are quite adequate since they promote hydrogenation within a reasonable time.

The extent of poisoning of the selected catalyst for obtaining optimum results under specified reaction conditions may be readily determined by simple experimentation as illustrated in the examples appearing hereinafter. If the extent of poisoning is too little, then substantial enhancement of the α-β-isomer ratio is not obtained. On the other hand, if the extent of the poisoning is too great, then the ability to reduce the double bond is diminished, with attendant adverse effect on the yield of mixed isomers and of recovered α-isomer. If the selected tetracycline reactant includes an 11a-chloro substituent, it is convenient, in experimental runs, to gradually increase the ratio of poison to noble metal catalyst until the point is reached that some of the corresponding 11a-deschloro compound first survives in the final reaction product. When this occurs, the ratio of poison to catalyst is reduced slightly so as to avoid the presence of this compound in the final reaction product. At this point, a preferred or optimum poison-to-catalyst ratio exists since excellent α- to β-isomer ratios are obtained with highest over-all yield of the mixed product.

When the selected starting material does not include an 11a-chloro substituent, the most convenient way of determining optimum poison:catalyst ratio is similar to that just described. The ratio of poison to noble metal is gradually increased until unreduced 6-methylenetetracycline starting compound first appears in the final reaction mixture. When this occurs, the ratio of poison to catalyst is reduced slightly for obtimum results.

The tetracycline compounds to be reduced may be in amphoteric form or in the form of polyvalent metal salt complexes, or pharmaceutically-acceptable or pharmaceutically-unacceptable acid addition salts of the compounds. Among the pharmaceutically-acceptable salts are those of mineral acids including hydrochloric, hydriodic, hydrobromic, phosphoric, metaphosphoric, nitric and sulfuric acids. Also included are salts of organic acids such as tartaric, acetic, citric, malic, benzoic, glycollic, gluconic, succinic, arylsulfonic, e.g., p-toluenesulfonic, sulfosalicylic acids, and the like. The pharmaceutically-unacceptable acid addition salts include those of hydrofluoric acid and perchloric acids.

The α-6-deoxy-5-oxytetracylcline and α-6-deoxytetracycline products may be recovered as amphoteric compounds or as salts of any of the above-described acids, by methods familiar to those skilled in the art.

By the abbreviation p.s.i. used herein is meant pounds per square inch gauge pressure.

The foregoing description of the present invention and the examples appearing hereinafter are for the purpose of illustrating the present invention and are not limiting to the scope thereof, which is set forth in the claims.

Example 1

PREPARATION OF QUINOLINE-SULFUR

Thirty grams of synthetic quinoline, B.P. 105–107° C. at 11 mm. Hg, and five grams of sublimed sulfur were refluxed for 5 hours at a temperature of 220–230° C. and the resulting product was cooled in an ice bath. To this was added 350 ml. of distilled dry xylene. After standing for ½ hour the mixture was filtered by gravity. The resulting filtrate is referred to hereinafter as "poison-N," an abbreviated designation for "normal quinoline-sulfur." In these instances where the poison-N deposited a small amount of precipitate on sanding, clear supernatant solution was employed.

A crystalline material may be isolated from the quinoline-sulfur preparation, prior to the addition of xylene, by direct filtration or by addition of methanol followed by filtration. Whereas this crystalline poison also enhances the ratio of α- to β-isomer, yields of isomer mixture are lower than those achieved with poison-N.

The quinoline-sulfur product described above, prior to xylene addition, was also diluted with 100 ml. of methanol and stirred overnight. This mixture was filtered and the recovered solids were washed with methanol. The filtrate and washings were combined and diluted to 140 ml. with methanol. This solution was also used as a poison in several experiments reported below and is designated therein as "poison-F," an abbreviation for "fractionated poison."

Examples 2–15

Absent stated conditions to the contrary, Examples 2–15 were carried out in accordance with the following procedure. To 200 ml. of methanol in a Parr shaker, the indicated amount of poison was added. To this was added 2.0 g. of 50%-water-wet (50% volatile by test) 5% palladium-on-charcoal. The resulting mixture was stirred for 15 minutes and 1.0 g. of 11a-chloro-6-deoxy-6-demethyl-6-methylene-5-oxytetracycline - p - toluenesulfonate was added. After an additional 3 minutes' stirring, the mixture was hydrogenated for 1 hour at a pressure of 40 p.s.i.

Following hydrogenation, the reaction mixture was filtered and the catalyst cake washed five times with 50 ml. portions of methanol. The filtrate and washings were combined, concentrated and then diluted to 100 ml. in a volumetric flask for assay.

The yield of α-6-deoxy-5-oxytetracycline was determined by quantitative papergram assay with an accuracy of about ±1.4%. Thus, when the tabulation below reports a yield of α-isomer of 43%, the actual yield is between 41.6 and 44.4%, based on the tetracycline compound charged.

The yield of the corresponding β-isomer was determined by visual papergram assay. When the reported percent yield of β-isomer is of the order of 12–18%, this method of determination has an accuracy of about ±15–20%. Thus, when the yield of β-isomer is reported as 15%, the actual yield is between 12–18%. At lower reported β-yields, e.g., 4–7%, this method of determination has an accuracy of about ±30%. For example, when the reported β-isomer yield is 4.5%, the actual yield of the β-isomer is between 3 and 6%.

In Examples 6–11 wherein it is stated "catalyst poisoned, then washed," the following procedure was employed. The stated amount of 50%-water-wet 5% palladium-on-charcoal was poisoned with the specified amount of poison, then filtered, then washed twice with 25 ml. portions of 50% aqueous methanol. Excess solvent was removed from the catalyst and the still-wet catalyst was transferred into 200 ml. of methanol in the Parr shaker. The substrate (1.0 g.) was added and the experiment was continued as described above.

| Example No. | Conditions | Percent yield α-Isomer | Percent yield β-Isomer | Total yield α and β | Ratio α/β |
|---|---|---|---|---|---|
| 2 | No poison | 11 | 19 | 30 | 0.6 |
| 3 | Poison-N, 0.25 ml | 44 | 7.3 | 51 | 6.0 |
| 4 | Poison-N, 0.375 ml | 46 | 8 | 54 | 5.8 |
| 5 | Poison-N, 0.45 ml | 46 | 7.3 | 53 | 6.3 |
| 6 | Poison-N, 0.38 ml., catalyst poisoned, then washed. | 24 | 16 | 40 | 1.5 |
| 7 | Poison-N, 0.45 ml., catalyst poisoned, then washed. | 45 | 4.5 | 50 | 10 |
| 8 | Poison-N, 0.5 ml., catalyst poisoned, then washed. | 41 | 9 | 50 | 4.5 |
| 9 | Poison-N, 0.75 ml., catalyst poisoned, then washed. | (Produced 6-deoxy-6-demethyl-6-methylene-5-oxytetracycline in product.) | | | |
| 10 | Same as Ex. 7 but 1 atm. pressure. | 40 | 3.6 | 44 | 11 |
| 11 | Same as Ex. 10 but 1.50 g. catalyst and 0.34 ml. poison-N. | 41 | 6 | 47 | 6.8 |
| 12 | Poison-F, 2.5 ml | 43 | 15 | 58 | 2.9 |
| 13 | Poison-F, 4.0 ml | 48 | 13 | 61 | 3.7 |
| 14 | Poison-F, 4.5 ml | 48 | 12 | 60 | 4.0 |
| 15 | 1.0 g. 6-deoxy-6-demethyl-6-methylene-5-oxytetracycline hydrochloride as substrate, poison-F, 4.5 ml. | 37 | 12 | 49 | 3.0 |

Examples 16–22

Examples 16–22 were carried out as follows unless otherwise indicated. To a solution of 4.5 ml. of poison-N in 200 ml. of methanol, 20.0 g. of 5% palladium-on-charcoal (50% water-wet) was added. The mixture was stirred for 15 minutes and then filtered. The catalyst was washed four times with 50 ml. portions of methanol followed by two 50 ml. water washings. Excess water was removed from the cake and the catalyst was transferred into a Parr shaker. After the addition of 100 ml. of methanol to the catalyst, 10.0 g. of 6-deoxy-6-demethyl-6-methylene-5-oxytetracycline-p-toluene sulfonate was added and the mixture was stirred for 3 minutes. This slurry was then hydrogenated for 1 hour. The reaction mixture was then filtered through Super-cel and the cake was washed six times with 100 ml. portions of methanol. The filtrate and washings were combined and evaporated to a yellow-orange foam. The foam was dissolved in methanol, diluted to 50 ml. in a volumetric flask and a 5 ml. aliquot was removed for chromatographic analysis. The residual 45 ml. of solution was tranferred to an Erlenmeyer flask and 13.5 g. of sulfosalicylic acid was added followed by 50 ml. of water. After being stirred overnight, the mixture was filtered and the cake washed well with 1:1 methanol: water, followed by acetone and then ether. The crude α-6-deoxy-5-oxytetracycline sulfosalicylate was air-dried.

In the case of Example 20, the poison (4.5 ml. of poison-N) was added to 100 ml. of methanol in the Parr shaker and stirred magnetically. To this solution was added 20.0 g. of 5% palladium-on-charcoal (50%-water-wet) and the mixture was stirred 15 minutes. The 10.0 g. of substrate was then added, and the mixture was stirred an additional 3 minutes and then hydrogenated. Recovery was the same as described above. In the case of Example 21 the procedure was the same as in Example 20 except that the catalyst was washed with dimethyl formamide prior to the introduction into the Parr shaker.

drogenation as in the foregoing examples provided a 47.5% yield of α-6-deoxy-oxytetracycline with an α:β ratio of about 5. Without poison the ratio was about 1.

Example 27

10.0 grams 5% palladium-on-carbon (50% wet) and 1.875 ml. of poison-N were combined in 200 ml. methanol and cooled to −75° C. in a Dry Ice-acetone bath. Then 5.0 g. of 11a-chloro-6-deoxy-6-demethyl-6-methylene-tetracycline hydrochloride was added and the mixture was removed from the cooling bath and hydrogenated at about 40 p.s.i. for 2 hours. The reaction mixture was then filtered and the catalyst cake washed with methanol. The combined filtrate and wash were evaporated to a solid

| Example No. | Conditions | Percent yield α-Isomer | Percent yield β-Isomer | Total yield α and β | Ratio α/β |
|---|---|---|---|---|---|
| 16 | 3 p.s.i. pressure | 39 | 6 | 45 | 6.5 |
| 17 | 40 p.s.i. pressure | 42 | 7.3 | 49 | 5.7 |
| 18 | Same as Ex. 16 except 200 ml. methanol added to the catalyst. | 38 | 6 | 44 | 6.3 |
| 19 | Same as Ex. 16 except 3.6 ml. poison-N and 16.0 g. catalyst employed. | 42 | 7.3 | 49 | 5.8 |
| 20 | Same as Ex. 17 except did not filter and wash catalyst after poisoning. | 48 | 7.3 | 55 | 6.5 |
| 21 | Same as Ex. 20 but washed catalyst with DMF prior to poisoning. | 46 | 6 | 52 | 7.7 |
| 22 | Same as Ex. 20 but at 3 p.s.i. | 46 | 7.3 | 53 | 6.2 |

Example 23

2.0 grams 5% palladium-on-alumina and 1 ml. of poison-N were combined in 200 ml. methanol. After 3 minutes' stirring, 2.0 grams of 11a-chloro-6-deoxy-6-demethyl-6 - methylene - 5 - oxytetracycline-p-toluenesulfonate was added and the mixture was hydrogenated for one hour at about 40 p.s.i. The reaction mixture was next filtered with diatomaceous earth filter aid and the catalyst cake washed with methanol. The filtrate and wash were then combined and evaporated to dryness, and the dry solid was crystallized as before to yield 1.815 g. of product as the sulfosalicylate salt.

This experiment was repeated, omitting the catalyst poison, and 1.11 g. of sulfosalicylate salt recovered.

Paper chromatography of these filtrates and final products demonstrated that in the absence of poison a ratio of α:β isomer of about 0.2 was obtained, with extensive decomposition; whereas with poison the α:β ratio obtained was about 2, with very little decomposition. The presence of some 6-deoxy-6-methyl-6-methylene - 5-oxytetracycline in the latter product indicated that slightly more than the optimum poison level was employed.

Example 24

The experiments of Example 23 were repeated, substituting 5% rhodium-on-carbon for the palladium catalyst. An α:β isomer ratio of about 0.3 was obtained without poison, and a ratio of about 2 with poison. The yield of crystalline product from the poisoned hydrogenation was 0.99 g.; the product of the control run was not recovered.

Example 25

The experiments of Example 23 were again repeated, this time substituting 5% rhodium-on-alumina for the catalyst, and also reducing the poison level to 0.5 ml. The resulting ratio of α:β isomers was about 0.2 without poison and about 1 with poison. The yield of crystalline product from the poisoned hydrogenation was 1.51 g.; the product of the control run was not recovered.

Example 26

6.25 g. of dry 5% unreduced palladium-on-barium sulfate was combined with 1.5 ml. poison-N in 50 ml. methanol and 5.0 g. 11a-chloro-6-deoxy-6-demethyl-6-methylene-5-oxytetracycline-p-toluenesulfonate was added. Hyresidue and this was dissolved in 60 ml. methanol and treated with 60 ml. 1.5 N hydrochloric acid. After stirring overnight at room temperature the resulting slurry was filtered and the cake washed with 1:1 methanol:1.5 N hydrochloric acid and then with acetone and ether, to obtain 2.33 g. of product in the form of a hydrochloride. Paper chromatography showed a ratio of α to β-6-deoxytetracycline of about 1, with little degradation.

In a repeat experiment without poison, an α:β-isomer ratio of about 0.2 was obtained, with the presence of extensive degradation product detected in the reaction mixture.

Example 28

2.0 grams 5% palladium-on-carbon (50%) and 0.4 ml. poison-N were combined in 50 ml. methanol and 1.0 g. 6 - deoxy - 6 - demethyl - 6 - methylenetetracycline was added. After hydrogenation for an hour at room temperature and 40 p.s.i. pressure, the reaction mixture was filtered and the cake washed with methanol. Paper chromatography showed a ratio of α to β-6-deoxytetracycline of about 1. When the experiment was repeated without poison the ratio was found to be about 0.2. The products were not recovered.

Example 29

2.0 grams 5% palladium-on-carbon (50%) was slurried in 100 ml. dimethyl formamide (DMF) for 15 minutes, then filtered and washed with 100 ml. of fresh DMF. The thus-treated catalyst was next transferred to a solution of 0.225 ml. poison-N in 100 ml. DMF and stirred 15 minutes. 1.0 g. of 11a-chloro-6-deoxy-6-demethyl-6-methylene-5-oxytetracycline-p-toluenesulfonate was added and the mixture was hydrogenated for an hour at room temperature and 40 p.s.i. The reaction mixture was filtered and the cake washed with five 50 ml. portions of methanol. The combined filtrate and wash, diluted to a concentration of about 1 mg. solute per ml., was subjected to paper chromatography and the ratio of α to β-6-deoxyoxytetracycline found to be about 10.

When the procedure was repeated without poison the ratio was found to be 0.1, with extensive decomposition detected.

A series of experiments was then conducted employing poisoned palladium-on-carbon with other solvents, and results were as follows:

Solvent: α:β Isomer ratio
- Acetonitrile _____ 4
- Acetic acid _____ 4
- Ethanol _____ 3
- Ethylene glycol monoethyl ether_____ 5

Example 30

In a high-pressure experiment, 80 g. of 5% palladium-on-carbon (50% wet) was combined with 15.2 ml. poison-N in 400 ml. methanol. Next 40 g. 11a-chloro-6-deoxy-6-demethyl-6-methylene-5-oxytetracycline was added and the mixture was hydrogenated at 1500 p.s.i. for 35 minutes. A 47% yield of α-6-deoxy-oxytetracycline was recovered by the procedures previously described, with a ratio of α to β-isomer of about 7.

Hydrogenation at sub-atmospheric pressure (225 mm.) was also successfully tested with poisoned catalyst, this time the reaction proceeding more slowly, but again with favorable α:β ratios obtained.

Example 31

To 20 grams of 50% water-wet, 5% palladium-on-charcoal catalyst was added a solution of 0.120 gram thiourea in 100 ml. methanol. The mixture was stirred for 5 minutes and 10 grams of 11a-chloro-6-deoxy-6-demethyl-6-methylene - 5 - oxytetracycline p-toluenesulfonate added. After stirring for 5 minutes more, the mixture was added to a Parr shaker bottle and the system was purged with nitrogen. Hydrogen was then introduced to a pressure of 50 p.s.i. After one hour the reaction mixture was filtered and the cake washed with 50 ml. methanol followed by 75 ml. water. To the combined filtrate and wash, less an assay sample, was added 100 ml. water and 10 grams sulfosalicylic acid. The mixture was stirred overnight and filtered, and the solid product washed with methanol and dried. It weighed 6.38 grams and assayed 53.6% α-plus β-isomer; β-isomer content was 5.6%. Yield of α-6-deoxy-5-oxytetracycline sulfosalicylate represented a 30.6% conversion of the substrate.

As determined by paper chromatography, the ratio of α- to β-isomer in the filtrate sample was 4:0.7. The assay procedure is as follows: A diluted sample of the filtrate is applied to Whatman No. 4 chromatographic paper impregnated with McIlvaine pH 4.2 buffer and blotted. The chromatogram is developed (with a solvent system consisting of 40 parts ethyl acetate, 25 parts nitromethane and 2 parts chloroform by volume), dried and detected by exposure to ammonia vapor. Intensities of the α-isomer, β-isomer and reactant bands are compared to the intensities of bands prepared from standard solutions under 366 mμ light. Since the β-isomer salt is more soluble than the α-isomer salt, a major part of the β-isomer remains in the filtrate and therefore the ratio of α to β-isomer in the final product is higher than the ratio in the filtrate.

The content of α- plus β-deoxy isomer as a percentage of the final product is determined by spectrophotometric analysis employing the formula $$\frac{\left[OD_{349}-\frac{OD_{418}}{7.95}\right] \times DF \times 10^3}{218 \times L \times W}$$

where

OD is optical density in 0.01 N methanolic HCl at the indicated wavelength
DF is dilution factor, i.e. polume in ml. in which sample is dissolved
L is cell length in cm.
W is sample weight in mg.

The β-isomer content of the final product is determined by paper chromatography as previously described.

Example 32

Following the procedure of Example 31 but substituting 300 mg. of N,N-di-tert. butyl-2-thiourea for 0.120 gram thiourea and stirring for 15 minutes before and after introduction of the substrate, 6.85 grams of product was obtained, assaying 58.8% α- plus β-isomer; the β-isomer content was 7.0%. Yield of α-isomer of 6-deoxy-5-oxytetracycline represented 35.6% conversion of the substrate. Ratio of α- to β-isomer was 7.3/1 in the product and 4/0.6 in the filtrate.

Example 33

Following the procedure of Example 32, but replacing the N,N-di-tert. butyl-2-thiourea with 300 mg. of 1,3-di-n-butyl-2-thiourea, 6.8 grams of dry product was obtained, having an α- plus β-isomer content of 60.6%. The β-isomer content was 7%. The yield of α-isomer of 6-deoxy-5-oxytetracycline sulfosalicylate represented 36.4% conversion of the substrate. The ratio of α/β isomer was 7.6/1 in the product and 3/0.5 in the filtrate.

Example 34

A Parr shaker bottle containing 20 grams of a 50% water-wet, 5% palladium-on-charcoal catalyst and 100 ml. of methanol was pressured with carbon monoxide and shaken until the gauge reading dropped from 10 to 9 pounds. To the bottle was added 10 grams 11a-chloro-6-deoxy-6-demethyl-6-methylene-5-oxytetracycline p - toluene-sulfonate. This mixture was shaken for 5 minutes under nitrogen, and hydrogen was then introduced at 50 p.s.i. Reduction was continued until a negligible pressure drop rate was observed (about 90 minutes). The mixture was then filtered, and the cake washed with 50 ml. methanol and 75 ml. water. To the combined filtrate and wash was added 100 ml. water and 10 grams sulfosalicyclic acid. The mixture was stirred overnight and the salt which separated was filtered off, washed with methanol and dried, yielding 6.19 grams of product. Spectrophotometric assay showed an α-plus β-isomer content of 52.9%, with a β-isomer content of 7%. Conversion of substrate to α-6-deoxy - 5 - oxytetracycline sulfosalicylate was 28.4%. The ratio of α- to β-isomer was 3.5/1 in the filtrate and 6.6/1 in the product.

Example 35

When the procedure of Example 31 is repeated substituting for thiourea: tetramethylthiourea, carbon disulfide, potassium ethyl xanthate, 1-phenyl-2-thiourea, 1-ethyl-1-(1-naphthyl)-2-thiourea, 1 - p - hydroxyphenyl-2-thiourea, beta - isothioureidopropionic acid, 2-imidazolidinethione, isoquinoline-sulfur, quinaldine-sulfur, 4-methylquinoline-sulfur, 1,3-diethyl-2-thiourea, 2-mercaptopyridine, L-cystine or N,N-diethyl-2-thiourea, high yields of α-6-deoxy-5-oxytetracycline are obtained.

Similar results are obtained when 6-deoxy-6-demethyl-6-methylenetetracycline is reduced to α-6-deoxytetracycline.

Example 36

To 5.0 grams of 50% water-wet, 5% palladium-on-charcoal catalyst was added 100 cc. of a solvent mixture prepared by diluting 700 cc. of dimethylacetamide to 1000 cc. with water. The catalyst-solvent mixture was stirred 1–2 minutes and 0.75 cc. of normal quinoline-sulfur was added. The mixture was stirred for 15 minutes, 10 grams of 11a - chloro - 6 - deoxy - 6 - demethyl-6-methylene - 5 - oxytetracycline p-toluenesulfonate was added, and stirring was continued for an additional 15 minutes. Reduction then followed in a Parr apparatus at 50 p.s.i. initial hydrogen pressure until the pressure drop rate reached 0.01–0.02 p.s.i. per minute. Following hydrogenation, the reaction mixture was filtered and the filter cake washed with 50 cc. of the aqueous solvent and then with 75 cc. water. To the combined filtrate and wash were added 10 grams sulfosalicyclic acid. The resulting slurry was stirred for 6 hours at room temperature, filtered, washed with a 2:1 by volume water:dimethylacetamide, and finally with water. The product, dried at 40° C. for 8 hours, represented a 48.2% conversion of substrate to α - 6 - deoxy-5-oxytetracycline sulfosalicylate salt. The ratio of α-isomer to β-isomer was 4.5:1 in the filtrate.

High yields of the α-isomer are similarly obtained when methyl ethyl ketone is substituted for dimethylacetamide in the solvent/water mixture.

Examples 37–62

When the procedure of Example 36 was repeated, substituting the listed solvents for the 70/30 DMAc/H$_2$O solvent, the indicated results were realized.

| Example | Solvent (vol./vol.) | Conversion to α-isomer (percent) | Ratio of α/β-isomer in the filtrate |
|---|---|---|---|
| 37 | 80/20 DMAc/H$_2$O | 41.4 | >6:0.6 |
| 38 | 60/40 DMAc/H$_2$O | 51.1 | >6:0.6 |
| 39 | 40/60 DMAc/H$_2$O | 51.0 | 5:0.8 |
| 40 | 20/80 DMAc/H$_2$O | <47.6 | 4:1.2 |
| 41 | 80/20 acetone/H$_2$O | 44.9 | |
| 42 | 70/30 acetone/H$_2$O | 48.4 | |
| 43 | 60/40 acetone/H$_2$O | 45.4 | |
| 44 | 40/60 acetone/H$_2$O | 51.4 | 4:1 |
| 45 | 20/80 acetone/H$_2$O | 42.1 | 3:1.5 |
| 46 | 10/90 acetone/H$_2$O | | 2.5:1.5 |
| 47 | 70/30 N-methyl-2-pyrrolidone/H$_2$O. | 59 | 6:0.7 |
| 48 | 70/30 Dimethylformamide/H$_2$O | 53 | 5:0.6 |
| 49 | 70/30 N-methylformamide/H$_2$O | 52.5 | |
| 50 | 70/30 N-butylformamide/H$_2$O | 47.0 | |
| 51 | 70/30 N-methyl-N-acetylformamide/H$_2$O. | 45.3 | |
| 52 | 70/30 N-methylacetamide/H$_2$O | 53.4 | |
| 53 | 70/30 N,N-diethylacetoacetamide/H$_2$O. | 43.4 | |
| 54 | 70/30 Formamide/H$_2$O | 42.4 | 6:1 |
| 55 | 70/30 Ethylene glycol/H$_2$O | <41.3 | 5:1.5 |
| 56 | 70/30 Tetrahydrofuran/H$_2$O | 44.8 | 5:0.7 |
| 57 | 70/30 Tetramethylurea/H$_2$O | 58 | 5:0.7 |
| 58 | 70/30 Acetonitrile/H$_2$O | 46.4 | 6:0.7 |
| 59 | 70/30 2-ethoxyethanol/H$_2$O | 54 | 6:0.7 |
| 60 | 70/30 Propylene glycol/H$_2$O | <41.5 | 5:1 |
| 61 | 70/30 Dioxane/H$_2$O | 47.5 | 5:1 |
| 62 | 70/30 Methyl 1-methyl-2-pyrrolione-4-carboxylate/H$_2$O. | 48 | 5:1 |

Example 63

A Parr shaker bottle was charged with 20 grams of a 50% water-wet, 5% palladium-on-charcoal catalyst and 100 cc. of a 70/30, vol./vol., acetone/water solvent. The mixture was agitated for 15 minutes and 3 cc. of quinoline-sulfur added. The poisoned mixture was stirred for an additional 15 minutes and 10 grams of 11a-chloro-6-deoxy - 6 - demethyl - 6 - methylene - 5 - oxytetracycline p-toluenesulfonate was added. After 15 minutes additional agitation, the bottle was purged with nitrogen, and 50 p.s.i. hydrogen pressure applied. When the hydrogen uptake was brought to 0.03 p.s.i. per minute, the bottle was purged with nitrogen and the ingredients filtered. The filter cake was washed with 50 cc. of 70/30 acetone/water solvent followed by 75 cc. water. To the combined filtrate and wash was added 10 grams of sulfosalicyclic acid. The mixture was stirred at room temperature for 8 hours, filtered, washed with 50/50 acetone/water, water and acetone. The dried product weighed 6.61 grams and assayed 68.8% α-isomer of 6-deoxy - 5 - oxytetracycline sulfosalicylate. The filtrate had an α/β-isomer ratio of 4/0.5.

Example 64

The procedure of Example 63 was repeated, substituting for the 70/30 acetone/water solvent, 100 cc. of 70/30 vol./vol. dimethylacetamide/water; using 40 grams of the p-toluenesulfonate substrate; washing the product from the catalyst with ½ vol./vol. dimethylacetamide/H$_2$O; adding 40 grams of sulfosalicyclic acid; and washing the sulfosalicylate salt with a ½ vol./vol. DMAc/water wash. The dried product weighed 23.51 grams and assayed 93.6% α-isomer of 6-deoxy - 5 - oxytetracycline sulfosalicylate, with an α/β-isomer ratio of 56.5/0.7 in the filtrate.

Example 65

The procedure of Example 63 was repeated except that the catalyst was stirred with the 70/30 vol./vol. acetone/water solvent for only 1½ minutes before the quinoline-sulfur poison was added. The dried product weighed 6.58 grams and assayed 64.2% α-isomer of 6 - deoxy-5-oxytetracycline sulfosalicylate, with an α/β-isomer ratio of 3.5/0.5 in the filtrate.

Example 66

A. 7,7-BENZOQUINOLINE-SULFUR

To a 500 ml. round-bottom, 3-neck flask was added 13.87 grams 7,8-benzoquinoline and 1.665 grams sulfur. The mixture was heated until a solution was obtained and then maintained at 230° C. for 5 hours. The mixture was slowly cooled to room temperature and then refrigerated for three days before addition of 116.5 ml. of xylene. The solution was filtered twice with filter aid to obtain a clear solution.

B. Following the procedure of Example 36, 20 grams of 50% water-wet, 5% palladium-charcoal catalyst was combined with 100 ml. of 70/30 vol./vol. acetone/water solvent and 4.5 ml. of 7,8 - benzoquinoline-sulfur poison. The mixture was stirred for 15 minutes both before and after the addition of 10 grams of 11a-chloro-6-deoxy - 6 - demethyl - 6 - methylene - 5 - oxytetraacycline p-toluenesulfonate. The mixture was hydrogenated in a Parr apparatus, after purging with nitrogen, at 50 p.s.i. for about 1 hour. The mixture was then filtered and the cake washed with 50 ml. acetone and 75 ml. water. To the combined filtrate and wash was added 100 cc. water and 10 grams sulfosalicyclic acid. The mixture was stirred overnight, and the resulting salt was filtered from solution, washed with methanol and dried, yielding 6.8 grams. The salt assayed 68.8% α- plus β-isomer, with a β-isomer content of 7%. The yield of α-isomer of 6-deoxy-5-oxytetracycline sulfosalicylate represented 42% conversion of substrate.

Example 67

The procedure of Example 66 was repeated substituting 120 mg. thiourea for the 4.5 ml. of 7,8-benzoquinoline-sulfur, and hydrogenating at 50 p.s.i. for 45 minutes. The dried product weighed 6.05 grams, assaying 57.4% α- plus β-isomer; β-isomer content was 4%. The yield of the α-isomer represented 32.3% conversion of the substrate.

Example 68

The procedure of Example 66 was repeated, replacing the 7,8-benzoquinoline-sulfur with carbon monoxide. The mixture of catalyst and solvent was shaken in a bottle pressurized to 10 p.s.i. with carbon monoxide until a pressure drop of 5 p.s.i. was observed on the gauge. The bottle was then evacuated and 10 grams of the p-toluenesulfonate salt was added. The mixture was shaken for 5 minutes, purged with nitrogen and hydrogenated for 70 minutes. The dried product weighed 6.45 grams and assayed 75.3% α- plus β-isomer; the β-isomer assay was 4.2%. The yield of the α-isomer of the sulfosalicylate salt of 6-deoxy-5-oxytetracycline represented 45.9% conversion of substrate.

Example 69

The procedure of Example 66 was repeated, substituting 5 grams of catalyst for the 20 grams, 100 ml. of 70/30 vol./vol. dimethylacetamide/water for the acetone/water solvent and 50 mg. of 1-phenyl-3-(2-hydroxyethyl)thiourea for the 7,8-benzoquinoline-sulfur poison. Hydrogenation was begun at 50 p.s.i. and continued for about 1 hour. The dried product weighed 7.0 grams and assayed 78.8% α- plus β-isomer; the β-isomer content was 0.7%. The yield of the α-isomer of the sulfosalicylate salt of 6-deoxy-5-oxytetracycline represented 54.7% conversion of substrate. The ratio of α-/β-isomer in the filtrate was 5/0.4.

Example 70

The procedure of Example 69 was repeated, substituting 50 mg. of 1-phenyl-3-di-(2-hydroxyethyl)thiourea for the 1 - phenyl-3 - (2 - hydroxyethyl)-thiourea poison. The dried product weighed 5.65 grams and assayed 81.4% α- plus β-isomer; the β-isomer content was 1.4%. The yield of the α-isomer of the sulfosalicylate salt of 6-deoxy-5-oxytetracycline represented 45.2% conversion of substrate. The ratio of α-/β-isomer in the filtrate was 4/0.4.

Example 71

The procedure of Example 68 was repeated, substituting for the acetone/water solvent, 100 ml. of a 70/30 vol./vol. dimethylacetamide/water mixture and adding carbon monoxide for 10 minutes. Hydrogenation was begun at 50 p.s.i. and continued until the rate of pressure drop reached 0.01 p.s.i. per minute. The dried product weighed 4.01 grams and assayed 78.5% α- plus β-isomer; the β-isomer content was 10%. The yield of the α-isomer of the sulfosalicylate salt of 6-deoxy-5-oxytetracycline represented 27.4% conversion of substrate. The ratio of α-/β-isomer was 7/1 in the product and 3/1.5 in the filtrate.

What is claimed is:
1. In the process of introducing hydrogen into a reaction-inert medium containing a catalytic amount of a noble metal catalyst and a tetracycline compound selected from the group consisting of

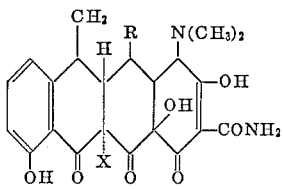

acid addition salts thereof and polyvalent metal salt complexes thereof wherein:
R is selected from hydrogen and hydroxyl and
X is selected from hydrogen and chloro and maintaining hydrogen in contact with the said reaction mixture at a temperature of from about 0–60° C. and at a pressure of from about 100 mm. to 2,000 p.s.i. until there is obtained an isomeric mixture of the corresponding α-6-deoxytetracycline and β-6-deoxy-tetracycline wherein X is hydrogen, the improvement which comprises employing a catalytic amount of a noble metal catalyst poisoned with a member selected from quinoline-sulfur, carbon monoxide, carbon disulfide, thiourea, tetramethylthiourea, 7,8 - benzoquinoline - sulfur, 1,3 - di-n-butyl-2-thiourea, N,N-di-tert. butyl-2-thiourea, potassium ethyl xanthate, 1-phenyl - 3-di-(2-hydroxyethyl)-2-thiourea, 1-pheny-3-(2-hydroxyethyl)-2-thiourea, 1-phenyl-2-thiourea, 1-ethyl-1-(1-naphthyl)-2-thiourea, 1-p-hydroxyphenyl-2-thiourea, beta-isothioureidopropionic acid, 2-imidazolidinethione, isoquinoline-sulfur, quinaldine-sulfur, 4-methylquinoline-sulfur, 1,3-diethyl-2-thiourea, N,N-diethyl-2- thiourea, 2-mercaptopyridine and L-cystine, said poisons promoting an enhanced ratio of α- to β-isomer in said product.

2. The process of claim 1 wherein said poison is quinoline-sulfur.
3. The process of claim 1 wherein said poison is carbon monoxide.
4. The process of claim 1 wherein said poison is 1-phenyl-3-(2-hydroxyethyl)-2-thiourea.
5. The process of claim 1 wherein said poison is 7,8-benzoquinoline-sulfur.
6. The process of claim 1 wherein said poison is thiourea.
7. The process of claim 1 wherein said tetracycline compound is 11a-chloro-6-deoxy-6-demethyl-6-methylene-5-oxytetracycline p-toluenesulfonate.
8. The process of claim 7 wherein the amount of said poison present in said reaction medium corresponds to an amount slightly less than that required to produce detectable amounts of 6 - deoxy-6-demethyl-6-methylene-5-oxytetracycline.
9. The process of claim 8 wherein said poison is quinoline-sulfur, said noble metal catalyst is palladium-on-charcoal, said temperature is from about 20 to about 40° C. and said pressure is from about one atmosphere to about 70 p.s.i.
10. The process of claim 1 wherein said reaction-inert medium is an organic solvent selected from acetone; N-methyl formamide; N,N-dimethyl formamide; N-methyl acetamide; N,N-dimethyl acetamide; N-methyl-2-pyrrolidone; methyl 1-methyl-2-pyrrolidone-4-carboxylate; and tetramethyl urea.
11. The process of claim 10 wherein said solvent contains from about 20 to 80 volume percent water.
12. The process of claim 10 wherein said solvent is acetone.
13. The process of claim 10 wherein said solvent is N,N-dimethyl-acetamide.
14. The process of claim 10 wherein said solvent is N,N-dimethyl-formamide.
15. The process of claim 10 wherein said solvent is N-methyl-2-pyrrolidone.

References Cited
UNITED STATES PATENTS
3,200,149   8/1965   Blackwood et al.

ALEX MAZEL, *Primary Examiner.*
ANNE MARIE TIGHE, *Assistant Examiner.*

PO-1050
(5/69)

UNITED STATES PATENT OFFICE
CERTIFICATE OF CORRECTION

Patent No. 3,444,198  Dated May 13, 1969

Inventor(s) James J. Korst

It is certified that error appears in the above-identified patent and that said Letters Patent are hereby corrected as shown below:

Column 13, lines 23-30, that portion of the formula reading:

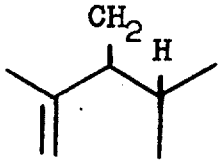

should read

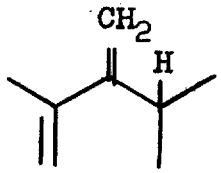

SIGNED AND SEALED

OCT 21 1969

(SEAL)
Attest:

Edward M. Fletcher, Jr.
Attesting Officer

WILLIAM E. SCHUYLER, JR.
Commissioner of Patents